(12) United States Patent  (10) Patent No.: US 7,246,836 B2
Hahn  (45) Date of Patent: Jul. 24, 2007

(54) SEAT HAVING SUSPENSION SYSTEM

(75) Inventor: Douglas C. Hahn, La Valle, WI (US)

(73) Assignee: Seats Incorporated, Reedsburg, WI (US)

( * ) Notice: Subject to any disclaimer, the term of this patent is extended or adjusted under 35 U.S.C. 154(b) by 32 days.

(21) Appl. No.: 11/175,660

(22) Filed: Jul. 6, 2005

(65) Prior Publication Data
US 2007/0007790 A1 Jan. 11, 2007

(51) Int. Cl.
B60N 2/02 (2006.01)

(52) U.S. Cl. .................................. 296/65.02
(58) Field of Classification Search ............. 296/65.02
See application file for complete search history.

(56) References Cited

U.S. PATENT DOCUMENTS

| | | | |
|---|---|---|---|
| 3,338,632 A | | 8/1967 | Kleinsorge |
| 3,655,968 A | | 4/1972 | Moore et al. |
| 3,788,697 A | | 1/1974 | Barton et al. |
| 3,913,975 A | | 10/1975 | Carter |
| 4,047,759 A | * | 9/1977 | Koscinski .............. 297/344.14 |
| 4,714,227 A | * | 12/1987 | Holm et al. ................. 248/595 |
| 4,822,094 A | * | 4/1989 | Oldfather et al. ........ 296/65.02 |
| 5,253,924 A | * | 10/1993 | Glance .................... 297/452.1 |
| 5,542,638 A | * | 8/1996 | Smith ......................... 248/421 |
| 5,651,585 A | * | 7/1997 | Van Duser ............. 297/344.16 |
| 5,743,591 A | | 4/1998 | Tame |
| 6,347,778 B1 | | 2/2002 | Koga et al. |
| 6,773,049 B2 | * | 8/2004 | Rupiper et al. ............... 296/63 |
| 7,134,713 B1 | | 11/2006 | Tseng |
| 7,134,721 B2 | | 11/2006 | Robinson |
| 7,147,287 B2 | | 12/2006 | Kuivala |

OTHER PUBLICATIONS

Industrial Seats, Division of United Group, Air Suspension Kit for Freightliner, M2 Medium Duty Trucks, 2002 & Up, http://www.industrialseats.com, published prior to Jul. 6, 2004.
National Seating, http://www.unitedgroupcommerce.com, published prior to Jul. 6, 2004.
Federal Motor Vehicle Safety Standards (FMVSS), 49 CFR Ch. V (Oct. 1, 2005 Edition), Sections 571.207 and 571.210, USA. Standards predate Jul. 6, 2004.
The Society of Automotive Engineers, Inc. (SAE), Surface Vehicle Recommended Practice, Issued Apr. 1999, pp. 1-11, J2287, Society of Automotive Engineers, Inc., Copyright 1999, USA.
The C.E. White Co., New! Drivers Safety Seat, Model ISH-2002, The C.E. White Co., 2003, New Washington, Ohio, USA.

* cited by examiner

Primary Examiner—Dennis H. Pedder
(74) Attorney, Agent, or Firm—Michael Best & Friedrich LLP

(57) ABSTRACT

A suspension system for an "All Belts To Seat" or "ABTS" style seat is provided that includes a floor bracket, seat bracket, and an equalizing bracket. Means for allowing motion between the seat bracket and floor bracket is provided by a set of cams. The equalizing bracket connects the cams and ensures synchronized rotation. The height of the seat bracket is adjustable with respect to the floor bracket by means of an air spring, and motion between the two brackets is dampened by an interconnected shock absorber.

8 Claims, 7 Drawing Sheets

SEAT HAVING SUSPENSION SYSTEM

BACKGROUND

The present invention relates to a seat having a suspension system.

SUMMARY

In one embodiment, the invention provides a seat adapted to be mounted to the floor of a vehicle. The seat includes an operator-occupied portion comprising base and upright portions to support an operator seated in the seat. The seat also includes a seat belt system including a belt reel mounted to one of the upright and base portions of the seat, a belt having one end interconnected with the belt reel to facilitate winding the belt onto the belt reel and an opposite end affixed to one of the upright and base portions of the seat, a first buckle member interconnected with the belt, and a second buckle member affixed to one of the upright and base portions of the seat, wherein interconnecting the first and second buckle members causes portions of the belt to extend across the lap and chest of a person sitting in the seat. A suspension system supports the operator-occupied portion of the seat and dampens up and down movement of the operator-occupied portion of the seat with respect to the vehicle floor.

In another embodiment, the invention provides a seat adapted to be mounted to the floor of a vehicle. The seat includes an operator-occupied portion comprising base and upright portions to support an operator seated in the seat. The seat also includes a suspension system including a frame mounted to the vehicle floor and supporting the operator occupied portion of the seat, and at least one suspension rod having a longitudinal axis and supported at first and second ends by the frame. The at least one suspension rod contains a circumferential groove near the second end, a means for resisting rotation of the suspension rod with respect to the portion of the frame supporting the suspension rod, and a locking member having an aperture sized to fit over the second end of the suspension rod and into the circumferential groove to resist motion of suspension rod in a direction parallel to the longitudinal axis.

In another embodiment the invention provides a suspension system for a seat adapted to be mounted to the floor of a vehicle. The suspension system includes a seat frame adapted to be mounted to the bottom of the seat and a floor frame adapted to be mounted to the vehicle floor. The invention also provides a forward suspension rod and a rear suspension rod, both interconnected at opposite ends to the floor frame and oriented generally parallel to each other, and a forward seat rod and a rear seat rod, both interconnected at opposite ends to the seat frame and oriented generally parallel to each other and generally parallel to the forward and rear suspension rods. The invention further provides a pair of forward cams, each of said forward cams being rotatably mounted to both the forward suspension rod and the forward seat rod, and a pair of rear cams rotatably mounted to each of the rear suspension rod and rear seat rod. The invention further provides an equalizing bracket interconnected to at least one of forward cams and to at least one of the rear cams. The invention further provides a biasing member applying a biasing force between the seat frame and floor frame, biasing the seat frame toward a default position with respect to the floor frame, and a shock absorber dampening movement of the seat frame with respect to the floor frame. Movement of the seat frame from the default position against the biasing force of the biasing member causes rotation of the forward and rear cams, wherein the interconnection of the equalizing bracket to the forward and rear cams synchronizes rotation of the forward and rear cams.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
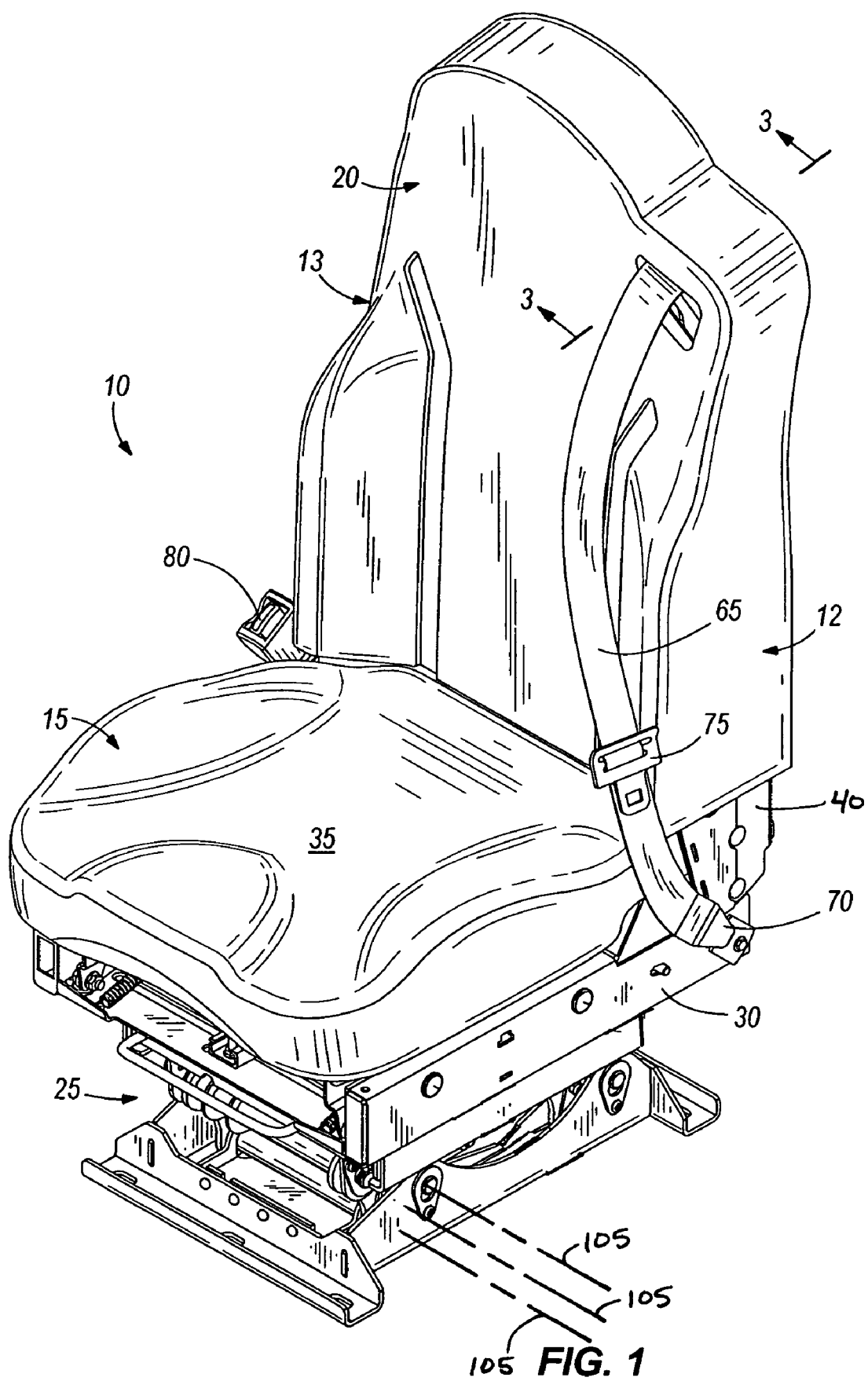
FIG. 1 is a front perspective view of a seat embodying the invention.

FIG. 1 illustrates a seat 10 having first and second sides 12, 13 (also referred to as left and right sides, respectively). The seat 10 includes a base portion 15 and an upright portion 20 that extends up from and is pivotable with respect to the base portion 15. The base and upright portions 15, 20 (together referred to herein as the "operator-occupied" portion of the seat) are supported by a suspension and shock absorbing apparatus 25 that provides a smooth ride for an operator seated in the seat 10.

Figure 2:
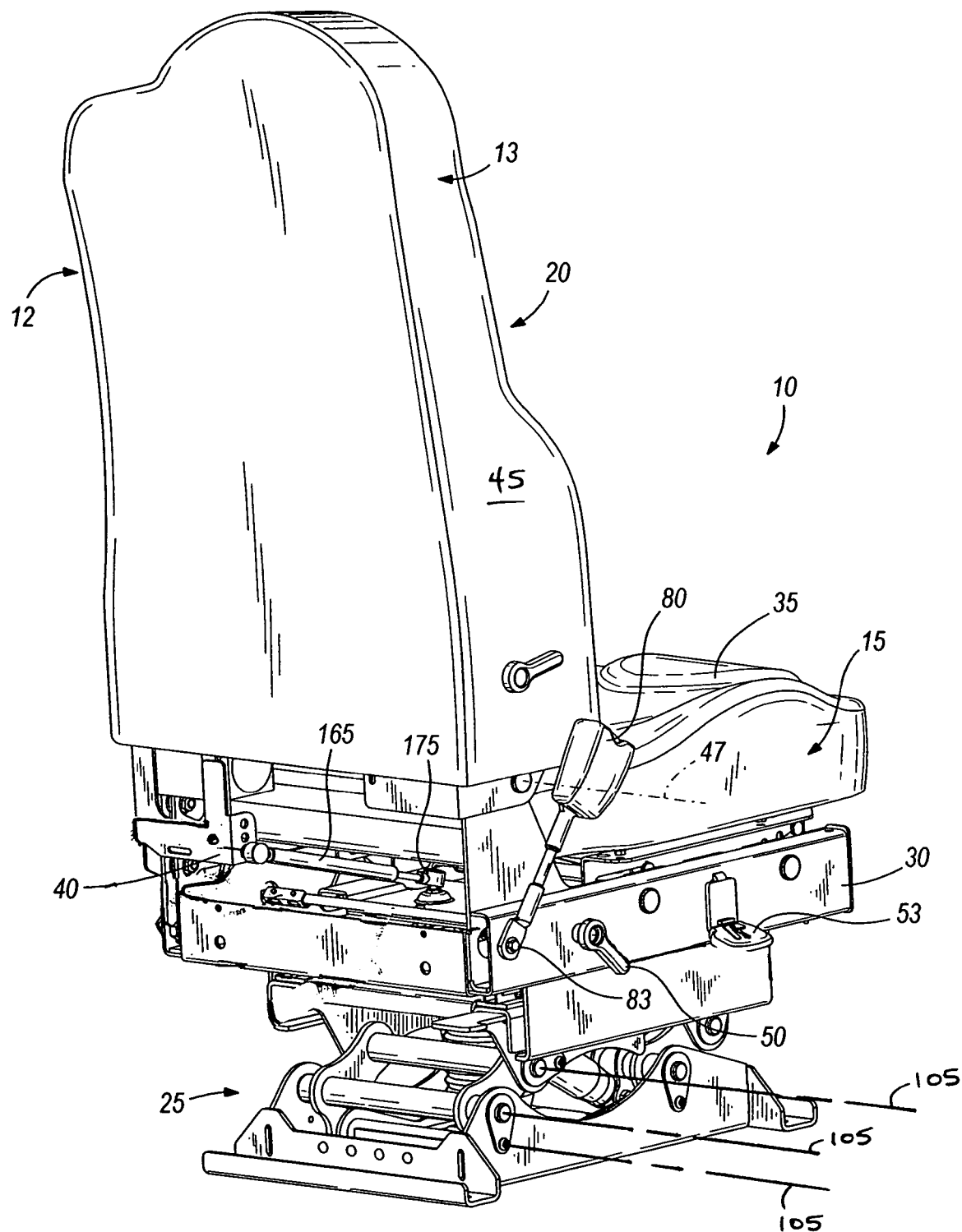
FIG. 2 is a rear perspective view of the seat.
Figure 3:
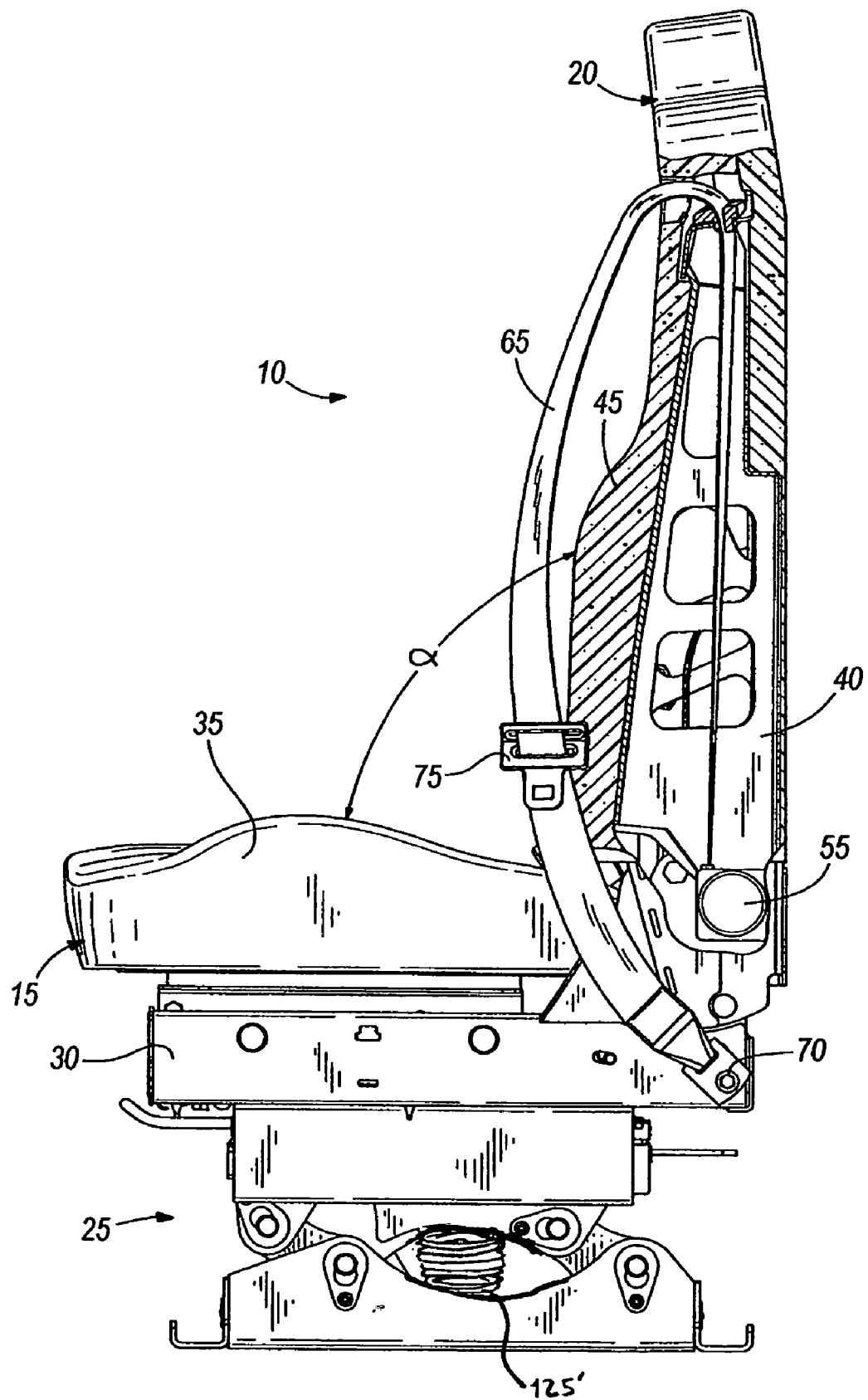
FIG. 3 is a cross-sectional view taken along line 3—3 in FIG. 1.
Figure 4:
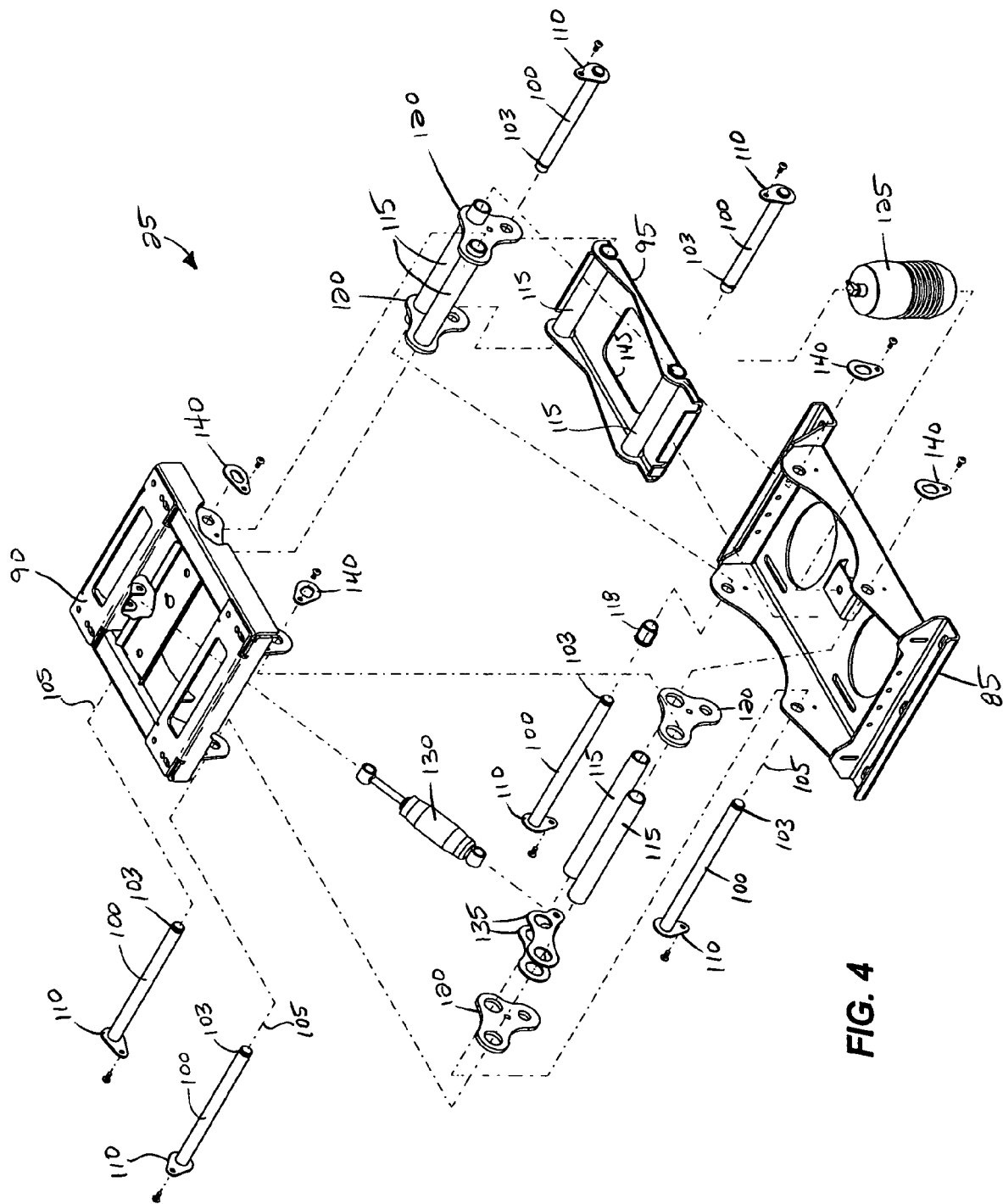
FIG. 4 is an exploded view of the suspension system of the seat.

With reference to FIGS. 1–3, the base portion 15 of the seat 10 includes a rigid base frame 30 and a bottom cushion 35 for supporting an operator seated in the seat 10. With reference particularly to FIG. 3, the upright portion 20 includes a rigid back frame 40 and a seat back cushion 45 mounted to the back frame 40. The upright portion 20 of the seat 10 is pivotably mounted to the base portion 15 about a pivot axis 47 (FIGS. 2 and 4). The orientation of the upright portion 20 of the seat 10 with respect to the base portion 15 is characterized by the included angle α (FIG. 3) between the top of the bottom cushion 35 and the front of the seat back cushion 45.

The recline and bottom cushion height adjustment mechanisms are actuated through respective recline and cushion levers 50, 53 (FIG. 2) on the right side 13 of the seat. The recline and bottom cushion height adjustment mechanisms are described and illustrated in more detail in co-pending and commonly-assigned U.S. patent application Ser. No. 11/175,659, titled "Seat Having Cushion Height and Recline Adjustment Mechanisms" and filed on Jul. 6, 2005, the entire contents of which are incorporated herein by reference. The illustrated seat 10 is useful, for example, as the driver's seat in a bus or delivery vehicle having no door on the driver's side. In such vehicles, the driver's seat is often positioned very close to a wall on the left side 12, and there is little clearance for the operator's hand to reach between the wall and seat on the left side 12. Positioning the recline actuation lever 50 and the cushion actuation lever 53 on the right side 13 affords easier access by the operator than if they were on the left side 12. The illustrated seat 10 can be used in other applications, however, whether or not there is a driver's side door.

The illustrated seat 10 is of the type commonly referred to in the art as an "All Belts To Seat" or "ABTS" seat. ABTS seats include seat belt arrangements with all anchor points on the seat frame itself, rather than on any structural portion of the vehicle in which the seat is mounted. ABTS seats are therefore modular in the sense that they can be installed in a vehicle without separate installation considerations for the seat belt. In the United States, Federal Standards FMVSS 207 & 210 dictate the forward force that a seat must withstand through its seat belt (referred to in the art as the "pull test"). To pass the pull test, most ABTS seats require a tether interconnecting the seat and the vehicle in addition to the seat's standard floor mounting.

The illustrated seat 10 includes a seat belt arrangement comprising a belt reel 55 (FIG. 3) mounted to the back frame 40 on the first side 12 of the seat 10, a belt 65 having one end interconnected with the belt reel 55 to facilitate winding the belt 65 onto the belt reel 55 and an opposite end affixed to the base frame 30 at a first anchor point 70 on the first side 12 of the seat, a first buckle member 75 interconnected with the belt 65, and a second buckle member 80 (FIG. 2) affixed to the base frame 30 at a second anchor point 83 on the second side 13 of the seat 10. In this regard, both of the opposite ends of the belt 65 are mounted to the seat frame 30, 40 and not to the vehicle in which the seat 10 is installed. The belt 65 extends up from the belt reel 55 along the back frame 40 to a height even with or slightly above the shoulder height of an operator seated in the seat 10. The belt 65 then extends down to the first anchor point 70. Interconnecting the first and second buckle members 75, 80 causes portions of the belt 65 to extend across the lap and chest of the operator sitting in the seat 10. The first buckle member 75 slides along the belt 65 to accommodate the size of the operator.

FIG. 4 illustrates the components of the suspension system 25, including a floor bracket 85, a seat bracket 90, and an equalizing bracket 95. The floor bracket 85 is rigidly affixed to the floor of the vehicle in which the seat 10 is installed. The operator-occupied portion of the seat 10 is mounted on top of the seat bracket 90. More specifically, the base frame 30 is mounted to the seat bracket 90. The suspension system 25 also includes a plurality of suspension support rods 100, each having a circumferential groove 103 at one end and a longitudinal axis 105. A flange 110 is fixed (i.e., welded or otherwise rigidly affixed) to the end of each support rod 100 opposite the circumferential groove 103, and a locking member 140 is mounted in the circumferential groove 103. More specifically, the locking member 140 has an aperture with a large diameter portion sized to fit over the end of the support rod 100 and a small diameter portion sized to snugly fit into the circumferential groove 103. The suspension system 25 also includes a plurality of tubes 115, a plurality of suspension cams 120, an air spring 125, a shock absorber 130, and a pair of shock cams 135.

The tubes 115 define bores having a diameter slightly larger than the diameter of the suspension support rods 100. The suspension support rods 100 fit snugly within the tubes 115 such that the longitudinal axis of each bore is substantially aligned with the longitudinal axis 105 of the associated rod 100. The rods 100 and tubes 115 are free to rotate with respect to each other, and in this regard the rods 100 may be characterized as being journaled within the tubes 115 or the tubes 115 may be characterized as being journaled on the rods 100. Nylon (or any other suitable low-friction material) bushings 118 may be employed between the suspension rods 100 and the suspension tubes 115 to reduce friction and noise, and to ensure a snug fit. Each suspension cam 120 defines three holes, two of which are of a diameter slightly larger than the outer diameter of the tubes 115, and one of which has a diameter slightly larger than the diameter of the suspension support rods 100.

The suspension support rods 100, cams 120, and tubes 115 are divided into substantially identical forward and rear sets. Within each set, a first one of the suspension support rods 100 extends through and is supported by holes at opposite sides 12, 13 of the floor bracket 85. The flange 110 and locking member 140 for this first suspension support rod 100 are fastened to the floor bracket 85 to prevent rotation and movement along the longitudinal axis 105 of the first suspension support rod 100 with respect to the floor bracket 85. A first one of the tubes 115 is journaled on this first suspension support rod 100 between the sides of the floor bracket 85. The suspension cams 120 receive the first tube 115 within one of their larger-diameter holes and are positioned at the opposite ends of the first tube 115.

Within each of the forward and rear sets, a second one of the suspension support rods 100 extends through and is supported by holes at opposite sides 12, 13 of the seat bracket 90. The flange 110 and locking member 140 for this second suspension support rod 100 are fastened to the seat bracket 90 to prevent rotation and movement along the longitudinal axis 105 of the second suspension support rod 100 with respect to the seat bracket 90. A second one of the tubes 115 is journaled on this second suspension support rod 100 between the sides of the seat bracket 90. The suspension cams 120 receive the second tube 115 within the other larger-diameter hole and are positioned at the opposite ends of the second tube 115.

Also within each of the forward and rear sets, a third one of the suspension support rods 100 is journaled within an integral tube 115 within the equalizing bracket 95. The suspension cams 120 receive either end of the third suspension support rod 100 within the smaller diameter hole. The flange 110 and locking member 140 for this third suspension support rod 100 are fastened to the associated suspension cam 120 to prevent rotation and movement along the longitudinal axis 105 of the third suspension support rod 100 with respect to the suspension cam 120.

The equalizing bracket 95 is interconnected to the suspension cams 120 and the suspension support rods 100 in order to increase stiffness between interconnecting parts in the suspension system 25 and to synchronize the motion of the forward and rear suspension cams 120. Synchronization of the suspension cam 120 motion ensures the operator-occupied portion of the seat 10 does not tilt front to back. At the upper and lower limits of the suspension system's 25 range of motion, the equalizing bracket 95 contacts range of motion limiters 137 (FIGS. 5–7) on the floor bracket 85. This contact limits the range of motion of the suspension system 25 and prevents damage to the suspension system 25 due to excessive suspension travel. In other embodiments the equalizing bracket 95 may be eliminated if acceptable suspension system 25 stiffness, synchronization of the cams 120, and range of motion limitations can be achieved without it.

Each shock cam 135 includes first and second holes of diameter slightly larger than the outer diameter of the tubes 115, and a third hole sized for a fastener that is journaled within one end of the shock absorber 130. In the illustrated embodiment, the first and second tubes 115 of the front set extend through the first and second larger-diameter holes in the shock cam 135, and the opposite end of the shock absorber 130 is pivotably mounted to the seat bracket 90.

One end of the air spring 125 is mounted to the floor bracket 85 and the other end is mounted to the seat bracket 90. The air spring 125 is centered with respect to the floor bracket 85 and seat bracket 90 and extends through a window 145 in the equalizing bracket 95. The window 145 is sized such that the equalizing bracket 95 does not come into contact with the air spring 125 as the equalizing bracket 95 moves through its full range of motion. The air spring 125 is vertically-oriented and biases the seat bracket 90 up away from the floor bracket 85. In an alternative embodiment, the air spring 125 may be replaced with a coil spring 125', see FIG. 3, or other suitable biasing means. One advantage to using an air spring rather than a coil spring lies in the ability to connect the air spring to the vehicle's pneumatic system and change the air spring's stiffness by varying the amount of air in the spring. This allows an operator to tune the spring stiffness to their personal liking.

Figure 5:
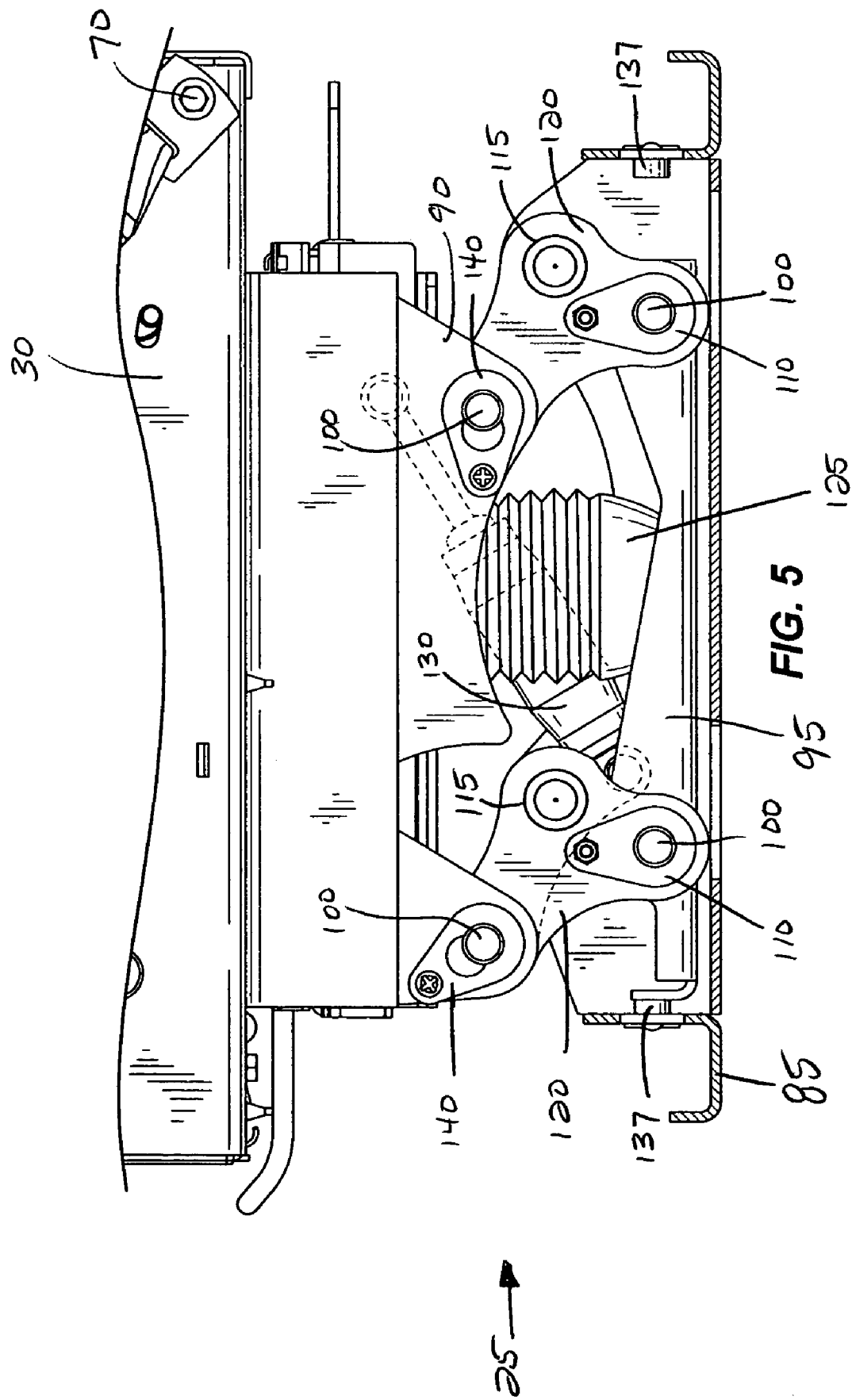
FIG. 5 is a side view of the suspension system of the seat in a first operating position.
Figure 6:
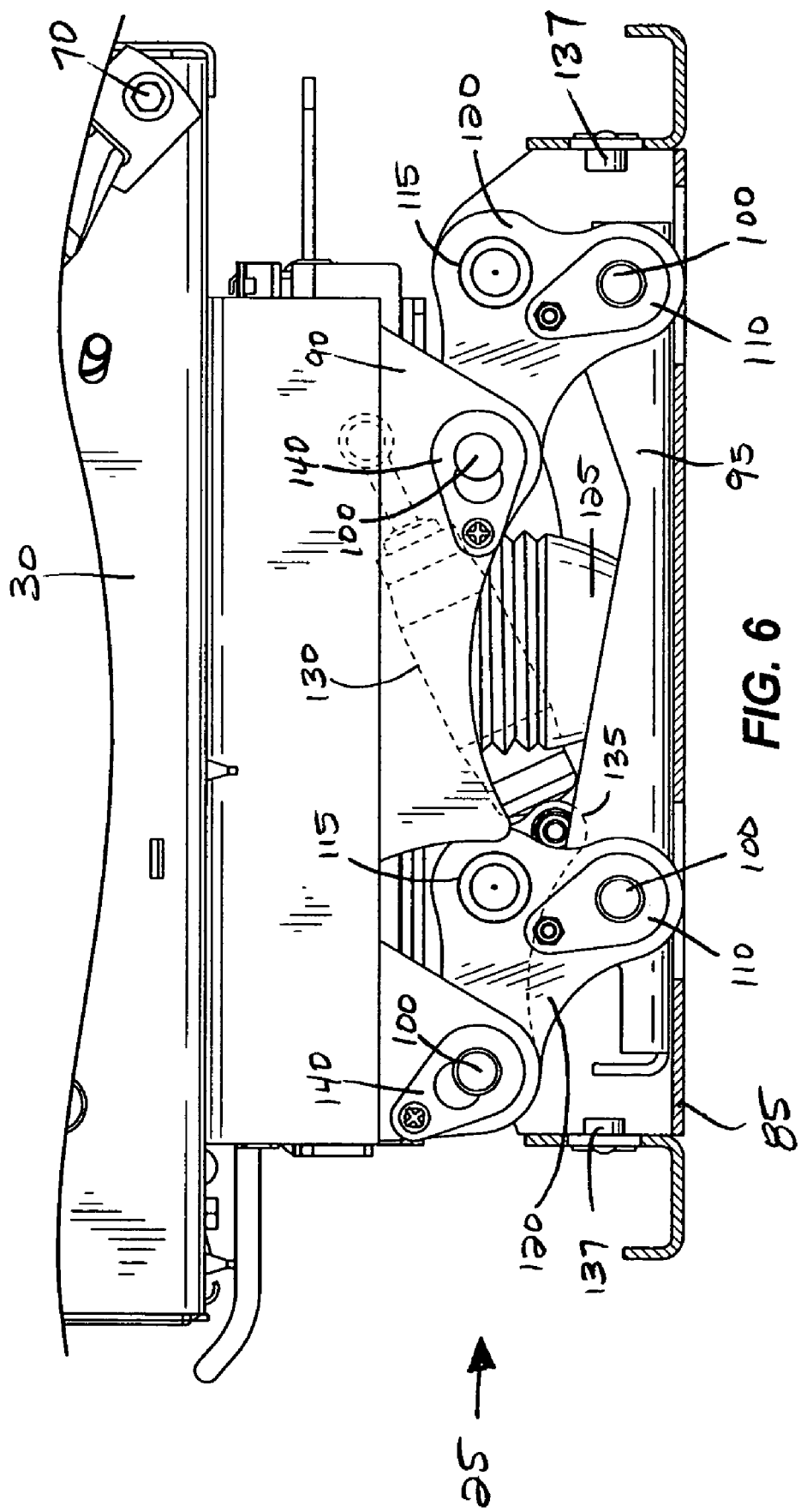
FIG. 6 is a side view of the suspension system of the seat in a second operating position.
Figure 7:
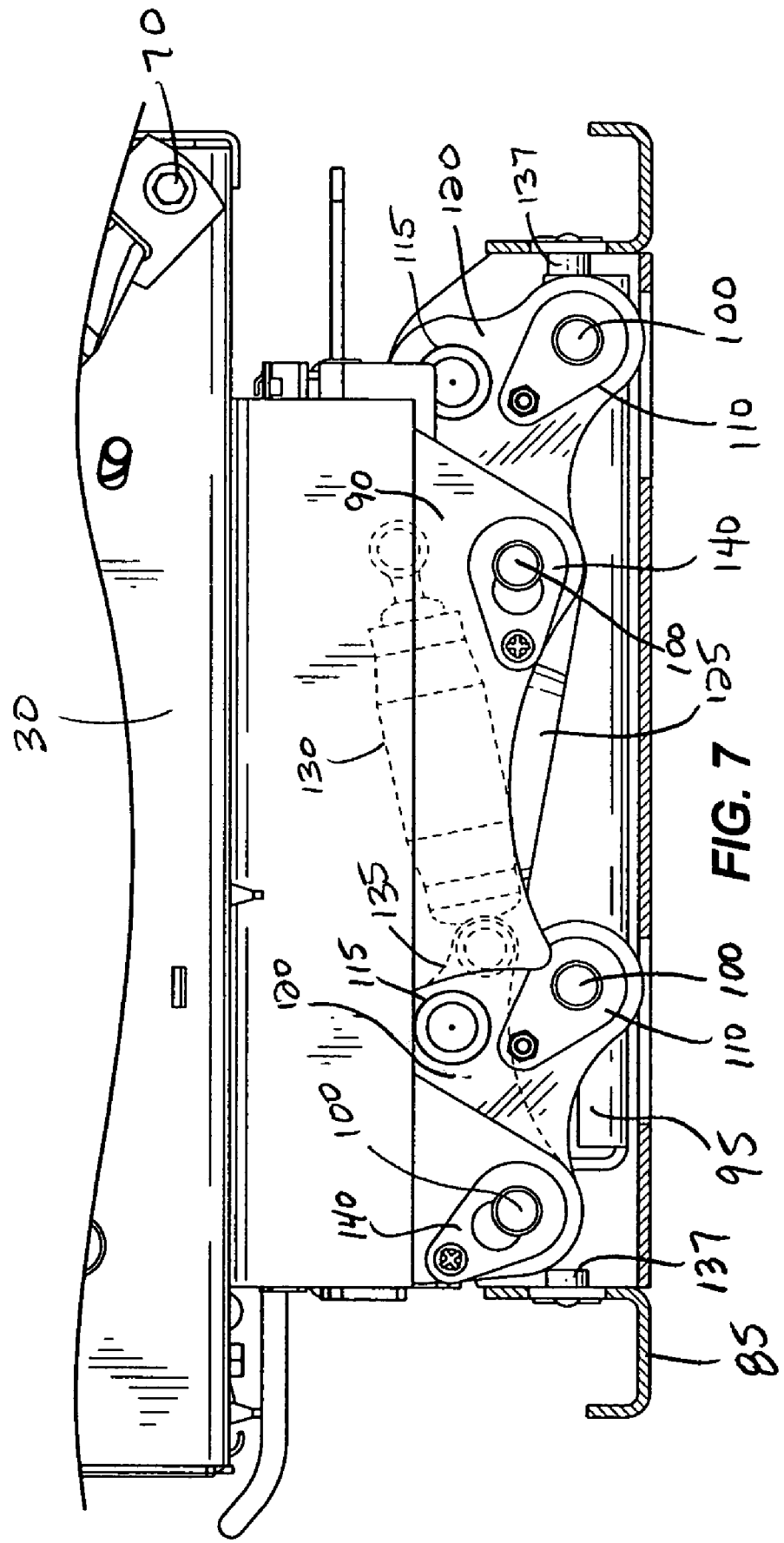
FIG. 7 is a side view of the suspension system of the seat in a third operating position.

With reference to FIGS. 5–7, the suspension support rods 100 interconnecting the seat bracket 90 and equalizing bracket 95 to the suspension cams 120 describe arcuate paths as the suspension cams 120 rotate. The arcuate paths described by the suspension rods 100 interconnecting the seat bracket 90 to the suspension cams 120 have relatively large vertical components and relatively small horizontal components, which results in substantially vertical movement of the seat bracket 90. The arcuate paths described by the suspension rods 100 interconnecting the equalizing bracket 95 to the suspension cams 120 have relatively large horizontal components and relatively small vertical components, which results in substantially horizontal movement of the equalizing bracket 95.

FIG. 5 illustrates a default position for the suspension system 25. This is characterized as the default position because the suspension system 25 is designed to assume this position in the absence of external forces (e.g., an operator seated on the seat and bumps and other dynamic forces arising from operation of the vehicle in which the seat is installed) acting on the suspension system 25. Stated another way, the air spring 125 biases the seat bracket 90 to the default position in the absence of an overwhelming external force. FIG. 7 illustrates the suspension system 25 in its full-down position, which is the end of the range of motion in which the seat bracket 90 is closest to the floor bracket 85 and in which the equalizing bracket 95 abuts the right range of motion limiter 137 as seen in FIG. 7. FIG. 6 illustrates an intermediate position between the default and full-down positions of FIGS. 5 and 7.

When a vertical force is applied to the suspension system 25, the floor bracket 85 and seat bracket 90 move toward each other against the biasing force of the air spring 125. Such vertical forces may arise from sudden downward movement of the seat bracket 90 (due, for example, to an operator initially sitting on the seat 10), from sudden upward movement of the floor bracket 85 (due, for example, to the vehicle moving over a bump in the road), or from a combination of sudden downward movement of the seat bracket 90 and upward movement of the floor bracket 85. As the seat bracket 90 and floor bracket 85 move toward each other, the air spring 125 deflects and the suspension cams 120 rotate counterclockwise as viewed in FIGS. 5–7. Once the vertical force is gone, the air spring 125 forces the seat bracket 90 and floor bracket 85 apart, and the cams 120 rotate clockwise as viewed in FIGS. 5–7. The space between the seat bracket 90 and the floor bracket 85 may oscillate as the air spring causes the seat bracket 90 to bounce up and down with respect to the floor bracket 85.

In the illustrated embodiment, the shock absorber 130 resists sudden counterclockwise and clockwise rotation of the suspension cams 120 as viewed in FIGS. 5–7. Thus, the shock absorber 130 dampens downward and upward movement of the seat bracket 90 and consequently has a dampening effect on oscillatory air spring 125 movement. The shock absorber 130 also resists large deflections of the air spring 125 under extremely sudden and transient vertical forces that may cause the suspension system 25 to top or bottom out. In alternative embodiments, the shock absorber 130 may be sized, oriented, and mounted within the suspension system 25 in substantially any manner that resists sudden movement of the seat bracket 90 and floor bracket 85 toward and away from each other.

Various features and advantages of the invention are set forth in the following claims.

What is claimed is:

1. A suspension system for a seat adapted to be mounted to the floor of a vehicle, the suspension system comprising:
   a seat frame adapted to be mounted to the bottom of the seat;
   a floor frame adapted to be mounted to the vehicle floor;
   a first forward suspension rod and a first rear suspension rod, both interconnected at opposite ends to the floor frame and oriented generally parallel to each other;
   a second forward suspension rod and a second rear suspension rod, both interconnected at opposite ends to the seat frame and oriented generally parallel to each other and generally parallel to the forward and rear suspension rods;
   a pair of forward cams, each of said forward cams being rotatably mounted to both the first forward suspension rod and the second forward suspension rod;
   a pair of rear cams rotatably mounted to each of the first rear suspension rod and the second rear suspension rod;
   an equalizing bracket interconnected to at least one of forward cams and to at least one of the rear cams;
   a biasing member applying a biasing force between the seat frame and floor frame, and biasing the seat frame toward a default position with respect to the floor frame;
   a shock absorber dampening movement of the seat frame with respect to the floor frame;
   wherein movement of the seat frame from the default position against the biasing force of the biasing member causes rotation of the forward and rear cams, and wherein the interconnection of the equalizing bracket to the forward and rear cams synchronizes rotation of the forward and rear cams;

at least one shock cam pivotably interconnected to one of the first and second, forward and rear suspension rods; wherein each of the forward and rear suspension rods includes a longitudinal axis; wherein one end of the shock absorber is mounted to the seat frame and an opposite end of the shock absorber is affixed to the at least one shock cam at a point spaced from the longitudinal axis of the suspension rod to which the at least one shock cam is mounted.

2. The suspension system of claim 1, further comprising a suspension tube around and rotatable with respect to each of the first and second forward and rear suspension rods; wherein each of the first forward and rear suspension rods is fixed against rotation with respect to the floor frame; wherein each of the second forward and rear suspension rods is fixed against rotation with respect to the seat frame; and wherein the forward and rear cams are mounted to the tubes.

3. The suspension system of claim 2, wherein the suspension tubes contain at least one nylon bushing between the outer surface of the suspension rod and the inner surface of the suspension tube.

4. The suspension system of claim 1, wherein the shock absorber is interconnected between the seat frame and at least one cam, the shock absorber dampening movement of the seat frame with respect to the floor frame by dampening rotational movement of the at least one cam.

5. The suspension system of claim 1, further comprising range limiters that are contacted by the equalizing bracket to limit range of motion of suspension system.

6. A suspension system for a seat adapted to be mounted to the floor of a vehicle, the suspension system comprising:
a seat frame adapted to be mounted to the bottom of the seat;
a floor frame adapted to be mounted to the vehicle floor;
a first forward suspension rod and a first rear suspension rod, both interconnected at opposite ends to the floor frame and oriented generally parallel to each other;
a second forward suspension rod and a second rear suspension rod, both interconnected at opposite ends to the seat frame and oriented generally parallel to each other and generally parallel to the first forward and rear suspension rods;
a pair of forward cams, each of said forward cams being rotatably mounted to both the first forward suspension rod and the second forward suspension rod;
a pair of rear cams rotatably mounted to each of the first rear suspension rod and second rear suspension rod;
an equalizing bracket interconnected to at least one of forward cams and to at least one of the rear cams;
a biasing member applying a biasing force between the seat frame and floor frame, and biasing the seat frame toward a default position with respect to the floor frame;
a shock absorber dampening movement of the seat frame with respect to the floor frame;
wherein movement of the seat frame from the default position against the biasing force of the biasing member causes rotation of the forward and rear cams, and wherein the interconnection of the equalizing bracket to the forward and rear cams synchronizes rotation of the forward and rear cams;
forward and rear equalizing rods generally parallel to each other and generally parallel to the first forward and rear suspension rods, the forward equalizing rod interconnected at opposite ends to the forward cams and the rear equalizing rod interconnected at opposite ends to the rear cams; wherein the equalizing bracket is interconnected to the forward and rear equalizing rods, making the suspension system more rigid and synchronizing rotation of the forward and rear cams.

7. The suspension system of claim 1, wherein the biasing member includes an air bag, the suspension system further comprising means for inflating and deflating the air bag to adjust the stiffness of the overall suspension.

8. The suspension system of claim 1, wherein biasing member includes a coil spring.

* * * * *